July 2, 1957  L. C. CHOUINGS  2,797,665
SERVO-ASSISTED LIQUID PRESSURE BRAKING SYSTEMS FOR VEHICLES
Filed March 30, 1953
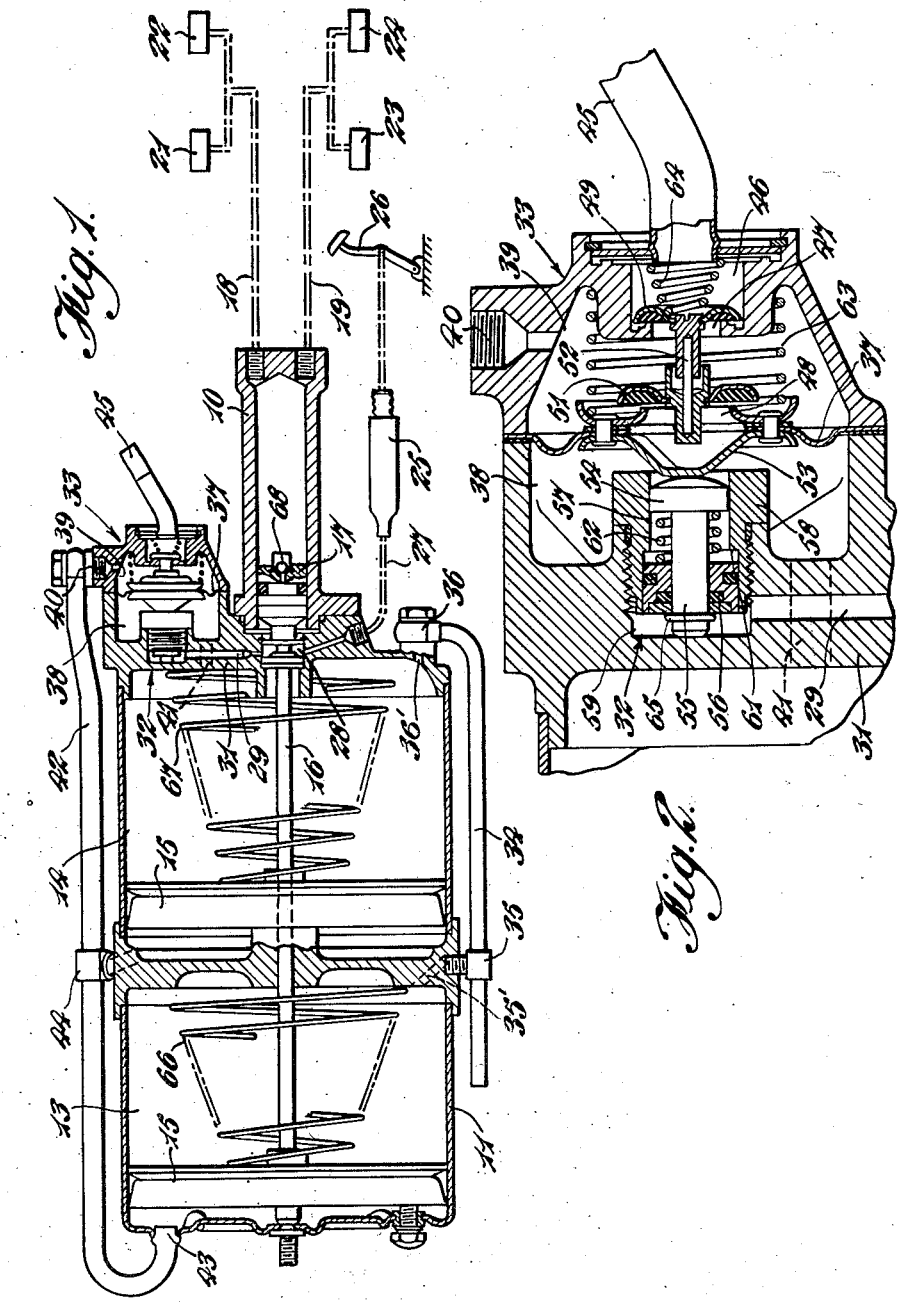

United States Patent Office 2,797,665
Patented July 2, 1957

2,797,665

SERVO-ASSISTED LIQUID PRESSURE BRAKING SYSTEMS FOR VEHICLES

Leslie Cyril Chouings, Leamington Spa, England, assignor to Automotive Products Company Limited, Leamington Spa, England Application March 30, 1953, Serial No. 345,627

7 Claims. (Cl. 121—38)

This invention relates to servo-assisted liquid pressure braking systems for vehicles, of the kind in which an air servo-motor is used to effect the working stroke of the piston in a main liquid pressure master cylinder supplying liquid for operating the brakes, the air servo-motor being brought into operation by movement of a control valve actuated by a liquid pressure motor cylinder connected to a second master cylinder actuated by a pedal or other foot or hand control and also connected to a liquid chamber which increases in volume as the main master cylinder is operated by the servo, the movement of the control valve to admit the working fluid to the servo being opposed by the pressure of said working fluid acting on the valve, so that the degree of operation of the servo varies with the pressure exerted by the operator on the foot or hand control.

In order that the servo may be accurately controllable, it is desirable that the motor cylinder piston on which the liquid pressure acts to open the valve should be small in relation to the area of the diaphragm or equivalent on which the working fluid acts to urge the valve towards its closed position, but a difference of area which is the most satisfactory from the point of view of controllability, results in an arrangement in which a relatively high pressure must be produced by the second master cylinder before the valve begins to open, thus delaying the action of the servo. The reason why the relatively high pressure must be produced by the second master cylinder before the valve begins to open is because the size of the diaphragm is limited by cost and space, and therefore the operating piston must be made relatively small; the frictional resistance to movement of the operating piston is therefore relatively high, thus necessitating a relatively high pressure to bring about the initial movement.

The object of the present invention is to provide a servo-assisted liquid pressure braking system of the kind referred to, in which provision is made for opening the control valve by a low pressure generated by the second master cylinder without adversely affecting the controlability of the servo.

According to the present invention, in a servo-assisted liquid pressure braking system of the kind referred to, the piston of the motor cylinder which operates the control valve comprises first and second parts one of which is slidable relative to the other, both of the said parts being subjected to the pressure produced in the second master cylinder, the first piston part transmitting the said pressure directly and positively to the control valve, whilst the second piston part transmits the said pressure to the control valve through a spring which yields at a predetermined pressure to allow the said piston part to engage a fixed abutment.

The invention is hereinafter described with reference to the accompanying drawings, in which:

Figure 1 shows, in diagrammatic form, one arrangement of a braking system including the invention; and Figure 2 is an enlarged sectional view of part of Figure 1, showing the control valve and the motor cylinder for operating it.

Referring to Figure 1, the system comprises a main liquid pressure master cylinder 10 mounted co-axially on one end of a vacuum servo-motor 11 divided by a partition 12 into two chambers 13 and 14 in each of which is mounted a piston 15. The two pistons are connected one to the other by a rod 16 one end of which projects into the master cylinder 10 and transmits the thrust exerted by the servo-motor to the piston 17 in the said master cylinder. The master cylinder 10 is connected by conduits 18, 19 to wheel cylinders 21, 22, 23 and 24 operating the brake members on the wheels of the vehicle.

A second liquid pressure master cylinder 25, operated by a foot-pedal 26 is connected by a conduit 27 to a space 28 behind the piston 17 in the main master cylinder 10, and a passage 29 in the end plate 31 of the servo-motor on which the master cylinder 10 is mounted connects the said space 28 to a motor cylinder 32 operating the control valve 33 controlling the operation of the servo-motor.

The vacuum in the servo-motor 11 is provided by any convenient suction means, not shown, such as the engine of the vehicle or an exhauster, which is connected to a pipe 34, connected in turn to the ends nearest to the master cylinder 10 of the two chambers 13 and 14 of the servo-motor at 35 and 36 through passages 35' and 36', respectively. The interior of the control valve 33 is divided by a flexible diaphragm 37 into two chambers 38 and 39, and a passage 41, shown in dotted lines in the drawings, connects the chamber 38 to the adjacent end of the chamber 14 of the servo-motor, so that the chamber 38 is permanently connected to the source of suction. A pipe 42 leads from the other chamber 39 being connected to a port 40 of the control valve 33 and is connected at 43 and 44 to the remote ends of the chambers 13 and 14, respectively of the servo-motor. An air inlet 45 to the control valve 33 leads into a cavity 46 in the control valve body, a port 47 connecting the said cavity to the chamber 39. A port 48 in the open center of the diaphragm 37 connects the two chambers 38 and 39, and two closure discs 49 and 51, mounted in fixed relation to each other on a stem 52, control respectively the ports 47 and 48.

The diaphragm 37 carries a bent cross-piece 53 co-operating with a head 54 on a stem 55 which, together with an annular member 56, constitutes the piston of the motor cylinder 32, the head 54 and member 56 being respectively slidable in the two parts of the stepped bore 57 of a sleeve 58 screwed into a cavity 59 in the end plate 31. A shoulder 61 in the bore 57 limits the movement of the annular member 56, and a spring 62 is mounted between the said member 56 and the head 54. A spring 63 urges the diaphragm 37 in a direction to maintain the cross-piece 53 in contact with the head 54, and another spring 64 urges the unit comprising the discs 49 and 51 towards the diaphragm. The annular member 56 is slidable on the stem 55, and both of these parts are subjected to any pressure created in the second master cylinder 25, which pressure acts to urge them towards the diaphragm 37. A spring ring 65, mounted in a circumferential groove in the stem, limits the movement of the member 56 away from the head 54.

When the braking system is inoperative, the diaphragm 37 is urged to the left, as shown in the drawings, by the spring 63, and the disc 49 is seated to close the port 47 by the spring 64, the disc 51 being then spaced from the diaphragm 37, as shown in the drawings, so that the chambers 38 and 39 of the control valve are in communication one with the other. Thus both chambers 13 and 14 of the servo-motor, on both sides of the pistons 15 therein, are connected to suction, and the said pistons are maintained at the left hand ends of the respective chambers by springs 66 and 67. Operation of the pedal 26 forces liquid from the second master cylinder 25 into the space 28 and through a passage in the piston 17 into the main master cylinder 10, until the pressure built up, acting on both the stem 55 and the annular member 56, is sufficient to displace the diaphragm 37 into engagement with the disc 51 thus closing the port 48 to separate the two chambers 38 and 39 of the control valve, and moving the discs 49 and 51 to open the port 47 and admit air from the air inlet 45 to the chamber 39, and through port 40 to the two servo-motor chambers 13 and 14 to the left of the pistons 15 therein. The pistons 15 are thus moved to the right to displace the piston 17 of the main master cylinder in the same direction, a non-return valve 68 in the passage through the piston 17 being closed automatically as the piston moves from its inoperative position, to enable pressure to be generated in the main master cylinder. The movement of the piston 17, by increasing the volume of the space 28, tends to reduce the pressure acting on the stem 55 and annular member 56, so that for any given pedal pressure the control valve takes up a lapped position in which the air pressure in the servo-motor, acting on the diaphragm 37, balances the liquid pressure acting in the motor cylinder 32 to open the valve. At a predetermined pedal pressure, depending on the strength of the spring 62, that spring yields, and the annular member 56 moves into engagement with the shoulder 61, so that further increase of pedal pressure is applied to the control valve only through the stem 55, and a given increase in pedal pressure above the critical value at which the spring 62 yields, produces a smaller increase in braking than a corresponding increase below the critical value.

Since, during the initial stages of a braking operation, the pressure produced in the second master cylinder 25 is exerted in the motor cylinder 32 on both the stem 55 and the member 56, the initial opening of the control valve is effected at a much lower pressure than would be necessary if the said pressure were exerted on the stem 55 alone, but once the pressure has risen to the value at which the member 56 engages the shoulder 61, the pressure produced by the second master cylinder 25 acts only through the stem 55, the area of which is sufficiently small in relation to the area of the diaphragm 37 to ensure controllability of the servo-motor.

It will be understood that, with suitable rearrangement of the control valve device, the invention may be applied to systems in which the servo cylinder on both sides of the piston is normally open to the atmosphere and one side is connected to suction when the brakes are applied.

I claim:

1. A pressure operated power device, including a valve controlling the operation of the power device, a pressure operated motor cylinder for actuating the control valve and having a bore therein, a first annular piston member in said bore, a second piston member in said annular piston, said pistons being movable relative to each other and each being constructed and arranged to deliver actuating force to said valve when subjected to pressure in said bore, yieldable means for transferring actuating force from one of said piston members to said valve, and abutment means against which said one of said piston members may bottom out after a predetermined yielding of said yieldable means to thereby limit the valve actuating force delivered to said valve by said one of said piston members to a generally predetermined value.

2. A pressure operated power device, as set forth in claim 1 wherein said second piston member is formed with a stem and head attached thereto, said head being in operative engagement with said valve, wherein said first piston consists of an annular piston reciprocably mounted on the stem, a spring surrounding said stem and interposed between the annular piston member and the head, and a stop operatively associated with said first piston member limiting reciprocable movement thereof with respect to said second piston member.

3. A pressure operated power device, as set forth in claim 1 wherein said first piston member is of a larger diameter than said second piston member, a spring is interposed between said two piston members, said spring being adapted to permit relative movement between said piston members when a predetermined pressure exists in said motor cylinder.

4. In a power booster for hydraulic systems, a power cylinder, a pressure responsive movable wall in said cylinder, and a hydraulically operated control valve for establishing a pressure differential across said movable wall comprising: valve means for controlling the admission of a pressure fluid to said power cylinder, first and second piston means constructed and arranged to actuate said valve means independently of each other, yieldable means for transferring actuating force from said second piston means to said valve means, means for subjecting said pistons to a hydraulic actuating pressure, and abutment means for limiting movement of said second piston after a predetermined yielding of said yieldable means to thereby limit the valve actuating force delivered to said valve means by said second piston to a generally predetermined value.

5. In a power booster for hydraulic systems, a power cylinder, a pressure responsive movable wall in said cylinder, and a hydraulically operated control valve for establishing a pressure differential across said movable wall comprising: valve means for controlling the admission of a pressure fluid to said power cylinder, a pair of relatively movable pistons operatively connected to said valve means, means for limiting movement of one of said pistons in a valve-opening direction, a valve preloading spring interposed between said one of said pistons and said valve means, and means for subjecting said pistons to a common hydraulic actuating pressure.

6. In a power booster for hydraulic systems, a power cylinder, a pressure responsive movable wall in said cylinder, and a hydraulically operated control valve for establishing a pressure differential across said movable wall comprising: valve means for controlling the admission of a pressure fluid to said power cylinder, a pair of relatively movable pistons operatively connected to said valve means, means for subjecting said pistons to a common hydraulic actuating pressure, one of said pistons having an effective area exposed to said actuating pressure greater than the effective area of the other of said pistons, means for limiting movement of the piston having the greater effective area in a valve opening direction, and a valve preloading spring interposed between said latter piston and said valve means.

7. In a power booster for hydraulic systems, a power cylinder, a pressure responsive movable wall in said cylinder, and a hydraulically operated control valve for establishing a pressure differential across said movable wall comprising: a poppet valve for controlling the admission of air under pressure to said power cylinder, a pair of relatively movable pistons operatively connected to said poppet valve for unseating the same, means biasing said poppet valve to seated position, a chamber adapted to receive hydraulic fluid, one of said pistons having an effective area exposed to the hydraulic fluid in said chamber greater than the effective area of the other of said pistons, means for limiting movement of the piston having the greater effective area in a valve opening direction, a valve preloading spring interposed between said latter piston and said poppet valve, and means for displacing hydraulic fluid in said chamber.

(References on following page)

References Cited in the file of this patent

UNITED STATES PATENTS

| | | |
|---|---|---|
| 2,252,482 | Gates | Aug. 12, 1941 |
| 2,377,699 | Klimkiewicz | June 5, 1945 |
| 2,393,524 | Fant | Jan. 22, 1946 |
| 2,398,252 | Rockwell | Apr. 19, 1946 |
| 2,433,953 | Ingres | Jan. 6, 1948 |
| 2,598,604 | Ringer | May 27, 1952 |
| 2,617,261 | Ringer | Nov. 11, 1952 |
| 2,631,433 | Thomas | Mar. 17, 1953 |
| 2,638,747 | Rockwell | May 19, 1953 |
| 2,658,347 | Stelzer | Nov. 10, 1953 |